United States Patent [19]

Neumeyer et al.

[11] 4,207,482
[45] Jun. 10, 1980

[54] MULTILAYERED HIGH VOLTAGE GRADING SYSTEM FOR ELECTRICAL CONDUCTORS

[75] Inventors: Charles L. Neumeyer, East Windsor, N.J.; Herbert E. Pietsch, Monroeville, Pa.

[73] Assignee: Westinghouse Electric Corp., Pittsburgh, Pa.

[21] Appl. No.: 960,691

[22] Filed: Nov. 14, 1978

[51] Int. Cl.² ............................................. H02K 15/12
[52] U.S. Cl. .................................... 310/45; 310/196; 428/331; 428/446
[58] Field of Search .......................... 310/43, 45, 196; 428/251, 408, 446, 480, 324, 331

[56] References Cited

U.S. PATENT DOCUMENTS

| | | | |
|---|---|---|---|
| 2,318,074 | 5/1943 | Hill et al. | 310/196 |
| 3,210,461 | 10/1965 | Berg et al. | 174/127 |
| 3,354,331 | 11/1967 | Broeker et al. | 310/196 |
| 3,364,066 | 1/1968 | Karlson et al. | 428/331 |
| 3,505,729 | 4/1970 | Balke et al. | 310/45 |
| 3,670,192 | 6/1972 | Andersson et al. | 310/196 |
| 3,823,334 | 7/1974 | Philofsky et al. | 310/196 |
| 3,824,683 | 7/1974 | Rhudy | 310/196 |

FOREIGN PATENT DOCUMENTS 51-13903   2/1976   Japan ........................................ 310/196

OTHER PUBLICATIONS

Hirabayashi et al., "A New Corona Suppression Method for High Voltage Generator Insulation", Proceeding of the 12th Electrical/Electronics Insulation Conference, 1975, pp. 139–142.

Primary Examiner—William R. Dixon, Jr.
Attorney, Agent, or Firm—D. P. Cillo

[57] ABSTRACT

An insulated electrical member is made, having in combination, an electrical member covered with insulation and a conducting varnish, where an abrasion resistant stress grading system covers at least part of the conducting varnish, the stress grading comprising: (1) a first base layer of resinous paint containing non-linear SiC having a resistivity value of between 2,000 to 4,000 Meg. Ohm/Square, in contact with the conducting varnish, (2) a second overlapping layer of resinous paint containing non-linear SiC having a resistivity value of between 4,000 to 6,000 Meg. Ohm/Square and containing at least one fibrous support, covering the first base layer and (3) an overcoat of an arc and track resistant resinous insulating varnish; where, at the point of overlap of the SiC layers, the thickness ratio of the base SiC layer:overlapping SiC layer is from 1:1 to 1:15.

10 Claims, 4 Drawing Figures

U.S. Patent  Jun. 10, 1980  4,207,482
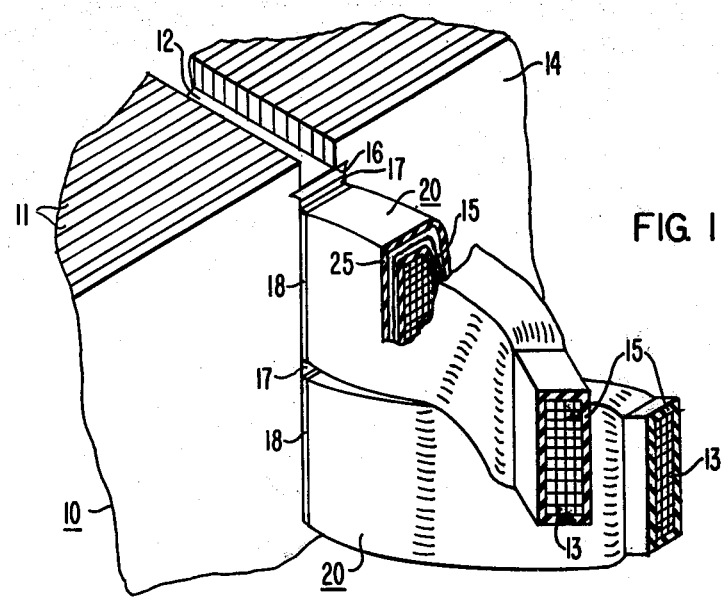
FIG. 1
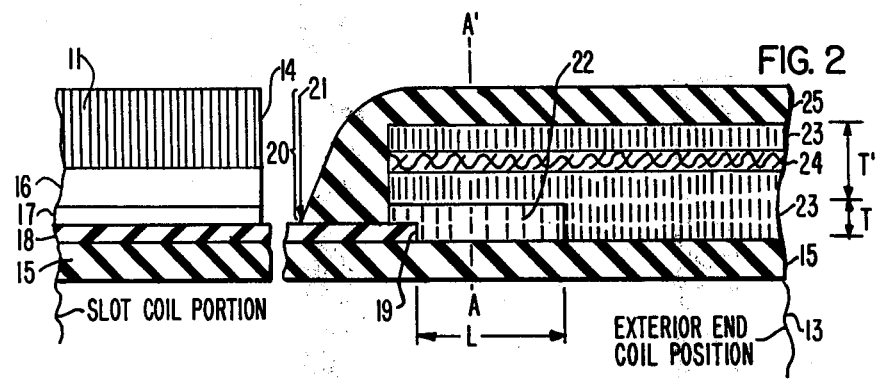
FIG. 2
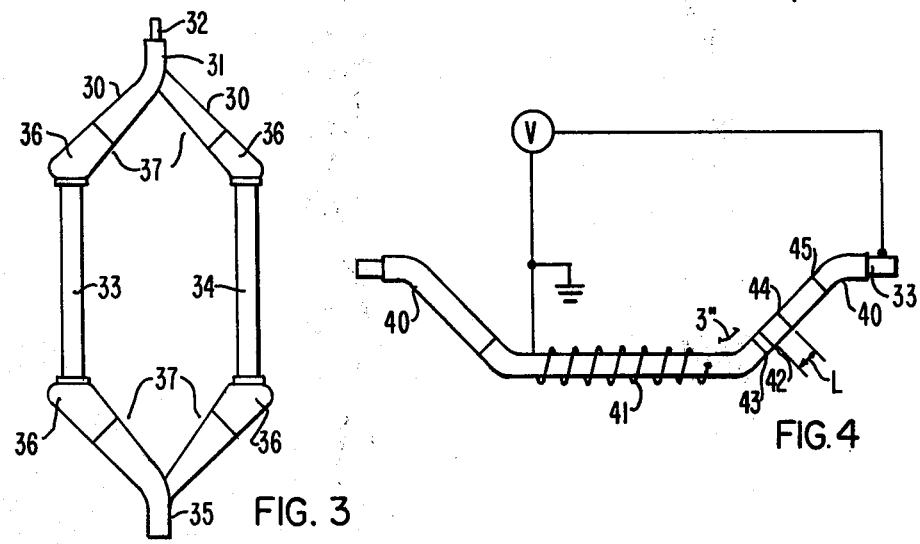
FIG. 3
FIG. 4

MULTILAYERED HIGH VOLTAGE GRADING SYSTEM FOR ELECTRICAL CONDUCTORS

BACKGROUND OF THE INVENTION

This invention relates to methods and means for eliminating corona in high voltage generators or other electrical machines having exterior coil windings disposed in air or other gaseous medium. The dangers of corona, in high voltage machines are well known. High voltage stator coils generally require the use of electrical stress grading systems along the exterior end portions of the coil for corona suppression. Without stress grading, the electric field along the surface of the coil can become sufficiently large so that the air layer adjacent to the coil can break down and flashover from the high voltage leads to the grounded machine can result.

Several methods of preventing corona discharge and short-circuiting have been used. One method, taught by Philofsky et al., in U.S. Pat. No. 3,823,334, consists of embedding epoxy resin strips containing barium titanate filler, within the coil insulation. The high dielectric strips are arranged so that predetermined intermediate voltage belts control the electric field within the insulation, and the surface stress does not reach too large a value. This method, however, requires precise positioning of the strips and a very high measure of quality control.

A simpler stress grading system involved the use of high resistance paint films on the insulation of the coil end portion, as taught by Hill et al., in U.S. Pat. No. 2,318,074. There, the entire insulated stator coil was painted with a 10 to 20 mil thick coating of a partially conducting material. The coating consisted of a varnish binder, and a major portion of a finely divided powder selected from carbonized cellulose, i.e., wood-char, and partially reduced titanium dioxide. After the varnish was applied, and while it was still wet, the coil was wrapped with a porous cotton, asbestos or braided glass reinforcement tape, so that the paint penetrated the tape. The impregnated tape was coated with a final coat of the same or a similar varnish. Thereafter, the slot portion of the coil could be overcoated with a relatively conducting paint. This method, however, provided a linear type varnish coating which made it useful primarily for low voltage machines, i.e., under about a 20 KV voltage class.

Later developed film coating systems, as taught by Berg et al., in U.S. Pat. No. 3,210,461, involved coating insulated, exterior stator coil portions next to the grounded stator laminations with a 10 mil thick coating of a semiconducting material. This material consisted of 1 part varnish binder and about 6 parts of finely divided non-linear silicon carbide powder, containing up to 4 wt.% of finely divided carbon. The resistivity of these silicon carbide coatings was non-linear, i.e., the resistivity varied with the voltage, whereas the resistivity of wood-char coatings was linear and remained constant irrespective of voltage. The exterior coil portions were simply coated with a single layer of the paint and dried. This method provided a somewhat brittle coating and was useful primarily in medium voltage machines operating at between about a 20 to 25 KV voltage class.

Broeker et al., in U.S. Pat. No. 3,354,331, taught non-linear silicon carbide in a suitable binder applied as a tape near the loop end portion of the stator coil. In a further development, S. Hirabayaski et al. in *Proceedings of the 12th Electrical/Electronics Insulation Conference*, "New Corona Suppression Method For High Voltage Generator Insulation", 1975, pp. 139–142, taught a more sophisticated grading system involving a double layer of a similar type non-linear semiconducting silicon carbide paint, each layer being insulated from the other by a thick, epoxy resin impregnated, mica paper separator.

In the Hirabayaski et al. teaching, the inner non-linear silicon carbide paint contacted the base conducting varnish at a base junction point. The outer layer of non-linear silicon carbide paint contacted the base conducting paint, through a conducting paint layer over the mica paper separator, at a second junction point displaced a critical distance down the coil tangent from the base junction point. This provided a grading system having somewhat improved failure voltages of about 80 KV, but the thickness of the stress grading system was substantially increased to about 175 mils, and quality control of the critically displaced junction points between the conducting varnish and the non-linear silicon carbide paint layers was difficult.

What is needed is a voltage grading system having a cross section no greater than about 150 mils, to provide more clearance between the assembled coil tangents, in combination with higher failure voltages on the order of 95 KV. Such a system could be used on high voltage machines operating at about a 35 KV voltage class.

SUMMARY OF THE INVENTION

It has been found, unexpectedly, that the above problems are solved and the above need met, by providing a non-linear, abrasion resistant, high voltage grading system for conducting electrical members, consisting of two layers of non-linear silicon carbide paint, each layer having a different resistivity value. The grading system is applied by first coating an insulated conductor with a 5 to 15 mil (0.005" to 0.015") thick layer of non-linear silicon carbide resinous paint having a resistivity of between 2,000 to 4,000 Meg. Ohm/Square. This coating is completley overlapped by a coating of non-linear silicon carbide resinous paint having a resistivity of between 4,000 to 6,000 Meg. Ohm/Square, which is extended down the insulated conductor.

While the overlapping paint is wet, a porous nonconducting tape material is wound around the conductor, so that the wet paint is completely covered and impregnates the tape. Then, at least one more layer of silicon carbide paint having a resistivity of between 4,000 to 6,000 Meg. Ohm/Square is applied over the impregnated tape. Finally, an overcoating of arc and track-resistant resinous insulating varnish is applied over the top paint layer.

The preferred stress coating system, for a high voltage stator coil exterior end portion comprises, in superimposed relationship: a base layer of low resistivity (2,000 to 4,000 Meg. Ohm/Square) silicon carbide paint; a completely overlapping layer of high resistivity (4,000 to 6,000 Meg. Ohm/Square) silicon carbide paint, which extends over the end of the base low resistivity paint near the end face of the magnetic core; a silicon carbide impregnated fiber glass tape; a second layer of high resistivity silicon carbide paint; another silicon carbide impregnated fiber glass tape; a final layer of high resistivity silicon carbide paint; and finally, at least one layer of an arc and track-resistant insulating enamel, covering and completely sealing the final layer of high resistivity paint.

The preferred grading system including the arc and track-resistant varnish has a thickness of between about 65 to 75 mils and a ratio of low resistivity paint: high resistivity paint including impregnated fiber glass tape but not including insulating enamel, of between about 1.5 to 1:4. The failure voltage is on the order of 100 KV or greater, making it useful for 35 KV voltage class machines.

BRIEF DESCRIPTION OF THE DRAWINGS

For a better understanding of the invention reference may be made to the exemplary embodiments shown in the accompanying drawings, in which:

FIG. 1 is an isometric fragmented view of exterior coils of an electrical apparatus;

FIG. 2 is a cross-sectional view of a portion of one coil shown in FIG. 1;

FIG. 3 is a plan view of a closed electrical coil member having two slot portions and two end portions; and FIG. 4 is a plan view of a half-coil used in the tests in the examples.

DESCRIPTION OF THE PREFERRED EMBODIMENTS

Referring now to FIGS. 1 and 2 of the drawings, a portion of an electrical apparatus such as part of the stator of a dynamoelectric machine is shown. The stator includes a magnetic core 10 that comprises a plurality of stacked laminations 11. In the portion of the structure shown, the magnetic core 10 is provided with a slot 12 within which are positioned electrical members adapted for high voltage use, such as conductor coils. These coils extend out of the slot to provide exterior conductor end coil portions 13, which are shown in fragmented and cross-sectioned views, extending outward from the end face 14 of the magnetic core.

A coating of insulation 15 is disposed about the conductor coils 13 both within and outside of the slot. This insulation may be a coating or tape comprising epoxy resin, polyester resin, phenolic resin, or the like, used alone or in conjunction with mica, in the form of mica flakes, mica paper or filler particles. A conventional slot wedge 16 of insulating material, generally epoxy-fiberglass, may be provided to secure the coils within the core. A conventional filler strip 17 of insulating material may also be disposed between the two coils and between the coil and the slot wedge.

Also shown, is conducting varnish coating 18, which covers a portion of the insulation 15 on the slot portion of the coil, and in the slot 12 of the magnetic core. The conducting varnish extends about 4 inches to 10 inches outwardly, from the end face of the core 14, on the exterior conductor end coil, to point 19 shown in FIG. 2. This conducting varnish generally consists of an insulating varnish base, such as a phenol resin, vinyl toluene modified alkyd resin, phenolic-alkyd resin, and the like, loaded with about 35 wt.% to 80 wt.% of generally contacting conducting particles, such as carbon and the like.

The stress grading system 20 of this invention is coated onto the coils before insertion into the slots of the magnetic core. As shown in FIG. 2 the grading system begins close to the face of the core. It may also begin a greater distance from the coil as where the coil begins to bend. The grading system 20 is in contact with, and overlaps the exterior portion of the conducting varnish coating 18. The grading system starts at a point 21, a distance of from about ½ inch to 3 inches, typically 1.5 inches, from the end 19 of the conducting varnish 18, overlapping it as shown in FIG. 2.

The stress grading system of this invention comprises a first, base, 5 to 15 mil thick silicon carbide layer 22 having a resistivity of between 2,000 to 4,000 Meg. Ohm/Square, i.e., Resistivity=V(volts per in. along the conductor)/I(microamp. per inch of exterior insulation perimeter). This is a well-known conductive coating term, defined for example in 1971 *EDN Bulletin,* Cahners Publication; A. J. Stock, May 1, 1971, pp. 1–5, herein incorporated by reference. This base coating extends a distance L of about 1 to 5 inches, typically 3 inches, past the end 19 of the conducting varnish 18. This base layer can have up to two fibrous supports therein, not shown in FIG. 2. These supports are made of cotton, linen, fiberglass and the like, impregnated with the 2,000 to 4,000 Meg. Ohm/Square silicon carbide paint.

This coating layer is completely overlapped by silicon carbide layer 23 having a resistivity of between 4,000 to 6,000 Meg. Ohm/Square, extending an additional 5 to 20 inches beyond distance L, depending upon the voltage class of the electrical machine. At the point of overlap, shown as dotted line A—A' in FIG. 2, the thickness ratio, shown as T and T', of base silicon carbide paint 22, with 2,000 to 4,000 Meg. Ohm/Square resistivity, covered by silicon carbide paint 23, with 4,000 to 6,000 Meg. Ohm/Square resistivity, i.e., T:T', must be from 1:1 to 1:15, preferably from 1:1.5 to 1:4. Over 1:15, i.e., thicker high resistivity paint, there is too much build, resulting in very close tolerances when placed in electrical machines. Under 1:1, there is too much heating at the SiC junction with the conducting paint. The covering silicon carbide paint thickness T' will include at least one fibrous supporting material 24, such as cotton, linen, fiberglass and the like, impregnated with the 4,000 to 6,000 Meg. Ohm/Square silicon carbide paint.

The tape provides an abrasion resistant system that resists chipping and cracking in the high voltage environment. The covering silicon carbide thickness T' is meant to include up to 6 such impregnated supports 24, which number of supports may be varied along the length of the layer. These fibrous supports for both high and low resistivity layers, usually a tape of from 3 to 20 mils thickness, are butt-lapped, half-lapped, or applied by other lapping techniques over the paint layer.

The silicon carbide paint comprises an insulating varnish base, such as chlorofluorocarbon resin, vinyl toluene modified alkyd resin and the like, loaded with generally contacting non-linear silicon carbide particles having non-linear electrical resistivity properties and having an average particle size of between about 1 to 150 microns (up to about 100 U.S. Sieve Mesh), preferably between about 5 to 100 microns. In the silicon carbide paints, the weight ratio of resin:SiC particles is between 1:2 to 1:6 preferably between 1:2.5 to 1:4. Above 1:6, the paint will not spread evenly, below 1:2 there is not enough SiC contact. This paint is usually applied in a toluene, vinyl-toluene, xylene or other similar type solvent medium.

In order to possess the desired non-linear resistivity properies, i.e., resistivity varying with voltage, the silicon carbide must contain small amounts, i.e., up to about 5 wt.% of doping materials such as aluminum or phosphorous. Such SiC materials are well known in the art and are commercially available, for example, as Carbotronic silicon carbide from the Carborundum Company and as electrical grade from the Norton Company. In these materials, when the trivalent aluminum atom occupies the location of the tetravalent silicon in the silicon carbide lattice, the missing electron causes the material to become p-conducting.

At very low currents (up to $10^{-9}$ amp. per particle-to-particle contact point) the current is proportional with the voltage. At increasing currents, the resistance of silicon carbide powder becomes increasingly non-linear, and at currents between $10^{-4}$ and $10^{-3}$ amp per contact point, the current, I, will follow the equation $I = K \cdot V^n$, where V is voltage and n is a number between 2 and 7. This non-linearity of the silicon carbide powder may be easily determined by measuring voltage at various currents in a cylindrical column having a diameter of one inch, where the powder is placed in the column between electrodes at a pressure of 400 psi. For satisfactory non-linear stress-grading coatings, n in the formula above, should be between 2 and 7 and preferably about 5.

The typical commercial grade of silicon carbide possesses such doping impurities and the other desired properties, and the term "non-linear silicon carbide" particles is here taken to mean such materials. These materials provide a silicon carbide coating which is a non-linear and self adjusting voltage divider. The preferred paint is a homogeneous admixture of 40 micron (U.S. Sieve 40 Mesh) non-linear commercial grade SiC:-vinyl toluene modified alkyd resin:toluene in a weight ratio of 3:1:1. Minor effective amounts, about 0.002 to 0.010 part, of naphthenate drying agents can also be included.

Thus, the exterior coil will be completely covered with insulation and will have a conducting varnish layer covering the insulation, starting a distance from the stator laminations, generally at a point where the coil begins to bend. The conducting varnish layer, at a point before the end of the conducting varnish, will be covered with a base, low resistivity SiC layer and then with a high resistivity SiC layer. The high resistivity layer will have incorporated therein from 1 to 6 alternating layers of high resistivity SiC paint and SiC impregnated fibrous supports.

A final track-resistant overcoat of insulating varnish 25, about 5 to 15 mils thick, is coated on top of the final layer of high resistivity SiC paint. This final insulating varnish can comprise polyamide resin, epoxy resin, hydrated alumina and suitable solvent. Any other suitable type of filled resin system resistant to electrical arcing and tracking can be used. This final coating completely covers and seals the silicon carbide paint layers and helps to prevent reaction of silicon carbide and the humidity in the atmosphere which could produce highly insulating silicon dioxide or oxidation of the paint at elevated temperatures. The total thickness of the stress grading system including the overcoat is between about 20 to 150 mils.

FIG. 3 shows a full electrical conductor coil of the type that can be used in stator slots of dynamoelectric machines. In machines over about 10 KV, half coils are generally used. The full coil has an end portion comprising a tangent 30, a connecting loop 31 and another tangent 30 with leads 32 extending therefrom. Slot portions 33 and 34 are formed to a predetermined shape and size. These slot portions are connected to tangents and another loop 35. The stress grading system 36 is shown as a slightly bulging wrapping on the exerior end portions of the coil 37. It is to be understood, however, that while stator coils have been emphasized here, any other type of electrical member can be adapted for high voltage use by applying the stress grading system of this invention.

EXAMPLE 1

A number of electrical half-coils were coated with a stress grade coating system. Copper stator half-coils rated at 20 KV voltage class, having 0.426 inch of epoxy-mica insulation, and 24 KV voltage class, having 0.542 inch epoxy-mica insulation were used. The tangent portion of these coils is shown as 40 in FIG. 4 of the drawings. The entire half-coil was wiped with a clean dry cloth and the conducting varnish was brushed over the entire slot portion 41 and 3 inches into the tangent portion, stopping at point 42. The conducting varnish was a vinyl toluene modified-alkyd base resin loaded with about 40 wt.% to 50 wt.% of conducting carbon particles. The conducting varnish was then allowed to air dry for 4 hours.

The tangent portion 40 was then cleaned with methyl chloroform. A base, low resistivity silicon carbide paint was then carefully brushed over 1.5 inches of the conducting varnish to point 43 and a distance L of 3.25 inches down the tangent portion to point 44 and allowed to air dry for 4 hours. The base, low resistivity silicon carbide paint contained a homogeneous mixture of 3 parts of 400 Grit (about 10 to 45 micron—U.S. Sieve, approximately 40 Mesh) non-linear silicon carbide powder of a 900 volt resistivity range, containing minor amounts of aluminum and/or phosphorous impurities (sold commercially by Carborundum Co. under the trade name Carbotronic Silicon Carbide); 1 part of a vinyl toluene modified alkyd resin having a viscosity (Demmler #1) at 25° C. of 200 to 330 sec. and 49% solids content (sold commercially by Jones-Dabney Co. under the trade name Styretex 376); 1 part of toluene solvent; and about 0.002 part each of lead and cobalt naphthenate drying agent.

A second, high resistivity silicon carbide paint was then carefully brushed over the base, low resistance silicon carbide paint, overlapping it and 1.5 inches of the conducting varnish to a point 43 and a distance down the tangent portion to point 45, a distance of 14 inches for the 20 KV rated coil and 16 inches for the 24 KV rated coil. This covering coating was allowed to air dry for 15 minutes at which point the coating was still wet.

Over the wet high resistivity silicon carbide paint, three half-lapped layers of 0.005"×1.5" untreated, porous, fibrous glass tape was applied with liberal brushing between the three glass tape layers with high resistivity silicon carbide paint to coat and impregnate the glass fibers. A final overcoat of the high resistivity silicon carbide paint was applied and the half-coils were then dried under heat lamps for 24 hours. The glass tape with the interposed and impregnating high resistivity silicon carbide paint extended down the tangent portion of the half-coils to point 45, a distance of 14 inches for the 20 KV rated coil and 16 inches from the 24 KV rated coil.

The high resistivity silicon carbide paint contained a homogeneous mixture of 3 parts of 600 Grit (about 9 to 35 micron—U.S. Sieve, approximately 35 Mesh) non-linear silicon carbide powder of a 1,400 volt resistivity range, containing minor amounts of aluminum and/or phosphorous impurities (sold commercially by Carboroundum Co. under the trade name Carbotronic Silicon Carbide); 1 part of the aforedescribed Styrex 376 resin; 1 part of toluene solvent; and about 0.002 part each of lead and cobalt naphthenate drying agent.

Both the low and high resistivity paints were separately brush coated as a single layer onto separate insulated rectangular aluminum test bars, about 6" in perimeter and 45" long, for resistivity measurements. Then, conducting paint electrodes 1½" wide were painted 3" apart along the length of the test bars. Current was applied at a rate of 2 microamps per inch of perimeter. A voltmeter was used to measure the voltage between adjacent electrodes on the coated surfaces. From the equation $R_e = V/I$, where V is volts per inch and I is microamps per inch of perimeter, the resistivity was found to be between about 3,000 to 3,500 Meg. Ohms/Square and between about 4,000 to 4,500 Meg. Ohms/Square respectively, for the low and high resistivity paints.

An arc and track-resistant protective overcoat insulating resin was mixed containing 1 part of a 67 wt.% solids solvent solution of epoxy resin and hydrated alumina filler and 1 part of a 67 wt.% solids solvent solution of polyamide resin and hydrated alumina filler. This insulating resin was carefully brushed over the final overcoat of the high resistivity silicon carbide paint, overlapping each end of the high resistivity silicon carbide paint by one inch, to completely seal the voltage grading system as shown in FIG. 2 of the drawings. After air drying for 4 hours, another coat of insulating resin was applied and allowed to air dry for 4 hours.

With reference to FIG. 2 of the drawings, the dried low resistivity silicon carbide layer 22 was about 10 mils thick and did not contain any fibrous support. The dried high resistivity silicon carbide layer immediately over the low resistivity layer was about 50 mils thick, and included three impregnated fiber glass tape support layers. The ratio of T':T was about 5:1. The total dried thickness of the stress grading system including the arc and track-resistant overcoat was about 65 mils.

The half-coils were then tested for failure voltage. As shown in FIG. 4 of the drawings, fine copper wire was wrapped around the slot portion 41 of each half-coil which was at ground potential, and high voltage was applied to the copper conductors of the half-coil 33. The voltage was applied across the half-coil insulation in step increments of 5 KV/min. starting at 35 KV for the 20 KV half coils and 45 KV for the 24 KV half coils. Failure voltage was taken to be the first indication of stress grading system smoking, with resultant blistering. The results are shown in Table 1, below.

For comparative purposes, several long copper stator sections rated at 20 KV voltage class, having 0.426 inch of epoxy-mica insulation were coated with conducting varnish similar to that used above. On two coil sections (Systems 4 and 5) a single layer of 11 mil thick high resistivity silicon carbide paint, similar to that described above, was brushed over 1.5 inches of the conducting varnish to a distance 14 inches past the conducting paint. This was dried and tested. On another 20 KV voltage class coil (System 6), a low resistivity silicon carbide paint, similar to that described above was brushed over 1.5 inches of the conducting varnish to a distance of 14 inches past the conducting paint and then overlapped with alternate layers of 0.005×1.5", untreated, porous, fibrous glass tape and additional low resistivity silicon carbide paint. This was dried and tested, providing a low resistance layer, with a total thickness of 118 mils, containing 2 glass reinforcement tapes. Similarly, a high resistance layer, with a total thickness of 135 mils, containing 3 glass reinforcement tapes (System 7) was tested. Finally a double band system without reinforcing glass tape or arc and track-resistant overcoat (Systems 8 and 9) was used, for both 20 KV and 24 KV rated coils. The results are shown below in Table 1.

TABLE 1

| SYSTEM | RESISTIVITY M OHM/SQ | BUILD MILS | VOLT CLASS KV | VOLTAGE STEP APPLIED KV | | SYSTEM FAILURE VOLTAGE KV |
|---|---|---|---|---|---|---|
| | | | | KV | SEC | |
| 1-low resistivity + high resistivity incl. 3 glass tapes + arc & track overcoat | 3,500 (low) 4,500 (high) | 10 (low) 50 (high) 5 | 24 | 100 | 45 | Did Not Fail |
| 2-low resistivity + high resistivity incl. 3 glass tapes + arc & track overcoat | 3,500 (low) 4,500 (high) | 10 (high) 50 (high) 5 | 24 | 95 | 11 | Did Not Fail |
| 3-low resistivity + high resistivity incl. 3 glass tapes + arc & track overcoat | 3,500 (low) 4,500 (high) | 10 (high) 50 (high) 5 | 20 | 95 | 12 | Did Not Fail |
| *4-high resistivity | 4,000 (high) | 11 (high) | 20 | 75 | 37 | 73 |
| *5-high resistivity | 4,080 (high) | 11 (high) | 20 | 75 | 32 | 72 |
| *6-low resistivity incl. 2 glass tapes | 3,750 (low) | 118 (low) | 20 | 70 | 18 | 66 |
| *7-high resistivity incl. 3 glass tapes | 4,170 (high) | 135 (high) | 20 | 80 | 50 | 79 |
| *8-low resistivity + high resistivity | 3,500 (low) 4,500 (high) | 10 (low) 10 (high) | 24 | 85 | 35 | 82 |
| *9-low resistivity + high resistivity | 3,500 (low) 4,500 (high) | 10 (low) 10 (high) | 20 | 70 | 45 | 68 |

*Comparative System

As can be seen, the invention Systems 1, 2 and 3 withstood degradation at up to 95 KV and 100 KV. Single low resistivity coatings even with glass tape failed at 66 KV. Thin, high resistivity coatings, without glass tape failed at 72 and 73 KV and thick coatings with glass tape, failed at 79 KV. Dual low resistivity + high resistivity coatings without glass tape or overcoat failed at 68 KV for the low rated system and 82 KV for the high rated system; they also chipped easily. The combination of low resistivity + high resistivity + overcoat of Systems 1, 2 and 3 provided a vastly superior system that was abrasion resistant and that could not be easily chipped off. Other fibrous supports and resin systems could be substituted, as described hereinabove, with equally good results. These results indicate that whole coils using these stress grading systems can be used in high voltage dynamoelectric machines such as turbines, generators and motors.

We claim:

1. An insulated electrical member adapted for high voltage use having in combination, an electrical member, electrical insulation disposed about said member and a conducting varnish covering a portion of the insulation, wherein an abrasion resistant stress grading system covers at least part of the conducting varnish, the stress grading system comprising: (1) a first base layer of resinous paint comprising non-linear silicon carbide particles having a resistivity value of between 2,000 to 4,000 Meg. Ohm/Square, in contact with the conducting varnish, (2) a second overlapping layer of resinous paint comprising non-linear silicon carbide particles having a resistivity value of between 4,000 to 6,000 Meg. Ohm/Square and containing at least one fibrous support therein, covering at least a part of the first base layer and (3) an overcoat of an arc and track-resistant resinous insulating varnish; wherein, at the point of overlap of the silicon carbide layers, the thickness ratio of the base silicon carbide layer:overlapping silicon carbide layer is from 1:1 to 1:15.

2. The insulated electrical member of claim 1, being an electrical coil.

3. The insulated electrical member of claim 2, wherein the first base silicon carbide layer contains from 1 to 2 fibrous supports therein, the silicon carbide overlapping layer contains from 1 to 6 fibrous supports therein, and the fibrous supports in both silicon carbide layers are 3 to 20 mil thick tapes selected from the group consisting of cotton, linen, and fiberglass tape.

4. The insulated electrical member of claim 2, wherein the conducting varnish comprises carbon particles and and the base silicon carbide layer is from 5 to 15 mil thick and covers from ½ to 3 inches of the conducting varnish.

5. The insulated electrical member of claim 2, wherein the average particle size of the silicon carbide is from about 1 to about 150 microns.

6. The insulated electrical member of claim 2, wherein, in the silicon carbide layer, the weight ratio of resin:silicon carbide is from 1:2 to 1:6.

7. The insulated electrical member of claim 2, wherein the conducting varnish comprises a carbon filled alkyd resin and the resinous silicon carbide paint comprises an alkyd resin filled with silicon carbide particles having an average particle size of between about 5 to 100 microns.

8. The insulated electrical member of claim 2, wherein the electrical insulation disposed about the member comprises mica.

9. The insulated electrical member of claim 2, wherein stress grading system has a thickness of between about 20 to 150 mils and a failure voltage of at least 95 KV.

10. A dynamoelectric machine having a stator portion with a plurality of the coils of claim 2 therein.

* * * * *